United States Patent
Kropf et al.

(10) Patent No.: US 11,453,289 B2
(45) Date of Patent: Sep. 27, 2022

(54) METHOD FOR REGULATING A DRIVE TRAIN OF A MOTOR VEHICLE, REGULATING DEVICE, AND MOTOR VEHICLE

(71) Applicant: AUDI AG, Ingolstadt (DE)

(72) Inventors: Marc Kropf, Ingolstadt (DE); Christian Graf, Ingolstadt (DE); Bernd Schäfer, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/241,629

(22) Filed: Apr. 27, 2021

(65) Prior Publication Data
US 2022/0024307 A1    Jan. 27, 2022

(30) Foreign Application Priority Data
Jul. 24, 2020 (DE) .......................... 102020119551.6

(51) Int. Cl.
*B60L 15/20* (2006.01)
*B60K 23/08* (2006.01)

(52) U.S. Cl.
CPC .......... *B60K 23/0808* (2013.01); *B60L 15/20* (2013.01)

(58) Field of Classification Search
CPC .............. B60K 23/0808; B60L 15/20; B60L 2240/421; B60L 2240/423
See application file for complete search history.

(56) References Cited

U.S. PATENT DOCUMENTS

| | | | | |
|---|---|---|---|---|
| 10,424,136 B2 * | 9/2019 | Oh | ........................... | B60K 6/48 |
| 2022/0024457 A1 * | 1/2022 | Kropf | ............. | B60W 30/18172 |

FOREIGN PATENT DOCUMENTS

| | | | | |
|---|---|---|---|---|
| CN | 110293854 A | * | 10/2019 | |
| DE | 102010029706 A1 | | 12/2011 | |
| DE | 102013018626 A1 | | 5/2015 | |
| DE | 102017105370 A1 | * | 9/2018 | ............... B62D 3/12 |
| DE | 102017109161 A1 | | 10/2018 | |
| DE | 102018200169 B3 | | 5/2019 | |
| DE | 102019000846 A1 | * | 8/2019 | |
| DE | 102019000846 A1 | | 8/2019 | |
| DE | 102018207079 A1 | | 11/2019 | |
| DE | 102018208046 A1 | | 11/2019 | |

OTHER PUBLICATIONS

German Examination Report dated Jul. 1, 2021 in corresponding German Application No. 102020119551.6, 10 pages; Machine translation attached.

* cited by examiner

*Primary Examiner* — Justin Holmes
(74) *Attorney, Agent, or Firm* — Maier & Maier, PLLC

(57) ABSTRACT

A method for regulating a drive train of a motor vehicle. The drive train includes, as components, a motor, at least one mechanical component, and at least one wheel. The motor is coupled to the at least one wheel via the at least one mechanical component. A speed of the at least one component of the drive train based on a speed specification is regulated using a model depicting the drive train of the motor vehicle. A torque generated by the motor is influenced as a regulated variable as a function of at least one state variable of the drive train determined on the basis of the model.

20 Claims, 3 Drawing Sheets

METHOD FOR REGULATING A DRIVE TRAIN OF A MOTOR VEHICLE, REGULATING DEVICE, AND MOTOR VEHICLE

FIELD

The invention relates to a method for regulating a drive train of a motor vehicle, the drive train comprising a motor, at least one mechanical component, and at least one wheel as components, the motor being coupled to the at least one wheel via the at least one mechanical component. The invention further relates to a regulating device as well as a motor vehicle.

BACKGROUND

A plurality of separate regulators are generally used in motor vehicles, each of which fulfills a different function in regulating a drive train of the motor vehicle. These regulators can each implement, for example, a speed limitation, load shock damping, and various component protection functions and/or comfort functions. The regulators can have different or even opposite regulating setpoints. A speed limitation can, for example, require a rapid reduction in torque when a maximum speed is exceeded, whereas jerk damping to avoid vibrations in a side shaft of the drive train will counteract this rapid reduction in torque. Since the regulators generally each use a torque generated by a drive motor of the motor vehicle as a regulated variable, prioritization and/or arbitration of the individual regulators is necessary in order to achieve stable and comfortable driving behavior of the motor vehicle.

However, such prioritization and/or arbitration of the individual regulators depends on a current operating state of the drive train and cannot be determined correctly and unambiguously in every state, since this would require a clear identification of the current state of the drive train. A change between different prioritized regulators, for example when changing between two different functions, can also lead to undesirable effects, since the respective regulators sometimes use different input variables and/or control variables. Various regulators for use in motor vehicles are known from the prior art.

DE 10 2018 200 169 B3 describes a method for regulating the speed of a motor vehicle. The motor vehicle has a drive train to which at least one speed control element is assigned. The drive train comprises at least one drive wheel and a drive motor. The speed of the motor is set by regulating the speed using a speed sensor, which determines the current speed of the motor.

DE 10 2013 018 626 A1 discloses a method for damping the load shock of a drive train for a motor vehicle that can be operated as an all-wheel drive. By means of a load shock absorber, which is connected upstream of a load shock damping unit, a total setpoint torque corresponding to a driver's request is damped and an total actual torque is determined. Depending on the specified operating limits of the drive axles, individual torques based on the total actual torque are determined and divided among the axles of the motor vehicle.

SUMMARY

The invention is based on the object of specifying an improved method for regulating a drive train of a motor vehicle.

To achieve this object, the invention provides for a method of the type mentioned at the beginning that a speed control of at least one component of the drive train is carried out on the basis of a speed specification using a model representing the drive train of the motor vehicle, in which a torque generated by the motor as a regulated variable is influenced as a function of at least one state variable of the drive train determined on the basis of the model.

The speed specification can depend, for example, on an accelerator pedal position, on transverse dynamics of the motor vehicle, and/or on a coefficient of friction between the at least one wheel and a surface and thus correspond to a current driving request of a driver of the motor vehicle and/or depend on a current driving state of the motor vehicle. In particular, a speed of the at least one wheel and/or a speed of the motor can be regulated as the speed of a component of the drive train. The use of at least one state variable for regulating the drive train makes it possible to advantageously adapt the regulation to the actually relevant variables at the location of an effect of the respective regulating function. In particular, state variables assigned to different components of the drive train, for example a wheel or a mechanical component such as a drive shaft or a side shaft extending from a gear to a wheel, can be considered so that direct regulation of the variables occurring on these components is made possible. As a result, it can advantageously be avoided that, in order to implement the function of individual regulators which are intended to have an effect on a component of the drive train, regulation must be carried out on or with other variables, for example variables of the motor as a torque regulator. A regulation, for example, on the air gap torque of an electric motor or a crankshaft torque in a combustion motor or on a speed of a motor can thus advantageously be dispensed with, in particular for a regulating function relating to a component of the drive train, in particular for regulating the speed of the at least one wheel.

In order to enable the use of the state variables that are directly relevant for driving behavior, a model depicting the drive train of the motor vehicle is used, which can be created on the basis of physical parameters such as stiffness, damping, and inertias of the drive train or of the components of the drive train. This model enables the use of a state regulator for the drive train regulation or for the regulation of individual output-side variables such as wheel speeds and/or wheel torques. Various functions of the regulation method can advantageously be set when designing the regulator by designing the speed and/or the damping behavior of the regulator in such a way that a transfer behavior of the torque at the motor to the torque on the wheel is obtained that corresponds to the desired function. In particular, a transfer behavior of the torque from the motor to the at least one wheel can be specified by a damping function. As part of a speed limitation for the speed of the at least one wheel, the transfer behavior of a target wheel behavior to the wheel can be specified, with this specification then resulting in a transfer behavior of the torque from the motor to the at least one wheel.

In this way, with the aid of the state regulator used according to the invention, many different regulating functions relating to the drive train can be implemented, it being possible to advantageously dispense with arbitration and/or prioritization of individual regulating functions. The method according to the invention advantageously makes it possible to combine and design a plurality of different regulators that were previously used separately in a closed regulator. Furthermore, the method makes it possible to use the functions of the regulators combined in this way in parallel and, in particular, without prioritization problems.

The regulator can be used for various applications depending on the choice of regulation parameters when designing the regulator used for regulation or in a regulating device realizing the regulator and/or depending on the specification of speed limits for speed control. In particular, the damping behavior of the regulation can be adapted to the requirements of various functions. For example, it is possible to implement a torque-minimum control in which the regulator is designed by adapting the damping and maintaining the natural frequencies of the regulator and/or as a Riccati design in which the interference variable can be weighted, so that advantageously only small actuating torques are generated when the regulator intervenes. A design based on a subsequent error regulation is also possible.

Another advantage of using the model depicting the drive train is that adapting the regulation method or adapting a regulating device designed to carry out this method to different motor vehicle models or to different variants of a motor vehicle model can be done in a simple manner by adapting the model parameters used in the method. In this way, the application effort for using the method can advantageously be reduced when there is a larger number of vehicle models and/or model variants.

The motor of the drive train can be a combustion motor or an electric motor. The method can also be used in a hybrid vehicle, in which, for example, the torque currently used of the motor of the hybrid drive or a total torque generated by both motors is used as the regulated variable. The use of a torque of the motor as a regulated variable here means that a different physical variable can be used to set the torque as a function of the motor. For example, it is possible that the setting of the torque in an electric motor takes place via a stator current generated by a converter, whereas, in the case of a motor designed as a combustion motor, the torque is set via a throttle valve position.

According to the invention, it may be provided that the model comprises at least a stiffness of a component of the drive train, at least a damping of a component of the drive train, and/or at least a moment of inertia of a component of the drive train. These model parameters advantageously enable the drive train of the motor vehicle to be represented for the model as a dual-mass oscillator, which links two components of the drive train, each with an assigned mass inertia, for example via a further component with an assigned stiffness. The model of the drive train with the model parameters can be adapted depending on the type or on the design of the drive train of the motor vehicle in which the regulation method is to be used.

In particular, a stiffness, a damping, and/or a moment of inertia can be taken into account both for the motor and for the wheel as well as for the at least one mechanical component via which the motor is coupled to the wheel. The at least one mechanical component can be, for example, a drive shaft or a side shaft and/or a gearbox. It is also possible to couple the motor to the at least one wheel via more than one further component of the drive train, for example via a gearbox and one or more side shafts.

In a preferred embodiment of the invention, it can be provided that the model comprises a time delay of a torque generation in the motor, a moment of inertia of the motor, a moment of inertia of the at least one wheel, and/or a stiffness of a drive shaft of the drive train. These model parameters have a special influence on the behavior of the drive train, so that, by using them in the model, a sufficiently precise description of the behavior of the drive train and thus the most precise possible regulation can be achieved. By taking one or more of these model parameters into account, other effects that have a lesser influence and/or effects that are difficult to depict in the model can advantageously be ignored, so that the regulator on which the method is based or its design can be simplified. However, it is possible that effects with a comparatively small influence can also be mapped in the model and thus taken into account.

According to the invention, a wheel speed, a torsion angle of a drive shaft of the drive train, a speed of the motor, an actual torque of the motor, and/or a load torque occurring on the at least one wheel can be determined as a state variable on the basis of the model. Due to the determination of the state variable or the state variables on the basis of the model, it is not necessary to use sensors for all of the state variables in order to measure the variables used as state variables, whereby the effort for a sensor system can advantageously be reduced. As a result, variables that are difficult to detect or that cannot be detected at all can be taken into account as state variables of the state regulator. Variables can also be used which, for example, are not detected in the motor vehicle with a sufficiently high resolution to achieve certain regulation functions, as can be the case, for example, with a wheel speed. For at least some of the state variables, a measurement can also take place via a sensor system in order to carry out a comparison of the observing entity or a model correction via feedback and thus improve the accuracy of the determination of the state variables through the possibility of an error correction.

A load torque estimated as a state variable represents an interference variable and can be used, for example, in the context of a feedforward control. If no feedforward control is used, then the consideration of the load torque in the observer can advantageously lead to an observer error disappearing, which is usually not the case without taking the load torque into account.

A torsion angle of a drive shaft, which, depending on the stiffness of the drive shaft, generates a torsional moment of the drive shaft that counteracts the torque of the motor, can only be measured using measuring devices that are usually not installed in a motor vehicle, such as special measuring shafts and/or strain gauges on the shaft. The use of the state variables derived from the model advantageously makes it possible to take these variables into account in the regulation even without using such measuring devices. A load torque occurring at the at least one wheel can, in particular, be viewed as an interference variable in the regulation method, which is adjusted accordingly. In this case, several different effects can be taken into account in the load torque, each of which has different effects or a different time dependency on the regulation of the drive train and/or which were not mapped in the modeling.

According to the invention, it can be provided that the state variable is determined by an observer, in particular a Luenberger observer. The at least one state variable determined using the model can be determined by an observer, which forms the basis of the state regulator. This observer can, in particular, be implemented as a Luenberger observer and can be designed, for example, by specifying the eigenvalue or specifying the pole, for example with binomial behavior. In addition to implementing the observer as a Luenberger observer, it is also possible to implement the observer in accordance with a different observer structure.

In a preferred embodiment of the invention, it can be provided that the at least one determined state variable is compared with at least one measured variable, in particular a wheel speed of the at least one wheel and/or an actual speed of the motor. The wheel speed of the at least one wheel and/or the actual speed of the motor can, for example, be measured via the at least one wheel or speed sensors assigned to the motor and used to calibrate the observer. As a result, the accuracy of the determined state variables can be increased, particularly also the accuracy of the non-measurable state variables determined by means of the observer.

According to the invention, it can be provided that a comparison with an actual speed of the motor and/or a wheel speed of the at least one wheel takes place as a function of a current operating state of at least one component of the drive train. For example, depending on operating state information that describes a current operating state of at least one component of the drive train, a selection can be made as to with which of the measured variables or with which combination of measured variables a comparison of the observer will be carried out. The operating state information can be transmitted, for example, from a control unit of the motor vehicle to a regulating device designed to carry out the method.

In a preferred embodiment of the invention, it can be provided that the regulation is implemented as a PI state regulator and/or as a state regulator with feedforward control and/or as a subsequent error regulation. The integral component (I component) of a PI regulator can advantageously improve the steady-state accuracy of the drive train control in the PI state regulation and compensate for effects in the speed control that are ignored in the model. Alternatively, an increase in the steady-state accuracy can also be achieved by implementing a feedforward control. When using a feedforward control, the regulator does not necessarily have to be designed as a PI state regulator, which means that no separate anti-windup measure is necessary. It is possible for the PI state regulator or the feedforward control to be designed in a subsequent error structure if asymptotic compensation of a control deviation is to take place for ramp-shaped setpoint specifications.

According to the invention, it can be provided that the speed specification is adapted to a limitation of a maximum speed and/or a minimum speed and/or to a setpoint speed control. This makes it possible to restrict the speed to a range between a maximum speed and/or a minimum speed depending on the function to be achieved in the regulation method. A setpoint speed control can also take place via the speed specification used in the method according to the invention or the regulating device implementing the method.

According to the invention, it can be provided that the regulated variable is adapted to damp a vibration of at least one component of the drive train and/or to protect a component of the drive train. For example, a design of the state regulator can be carried out with specification of quality criteria, for example according to Riccati, so that a dynamic and a damping behavior of the state regulator can be set such that, for example, the torsion of a mechanical component of the drive train, for example a drive shaft or a side shaft, is limited to a maximum value. By damping a vibration of at least one component of the drive train, a comfort function can be implemented which enables the most uniform and jerk-free driving operation possible.

According to the invention, it can be provided that the speed specification is adapted by a slip control to limit a slip of the at least one wheel and/or that the speed specification is adapted by an all-wheel regulation to create a speed difference. By appropriately designing the state regulator during the design, its dynamics and damping can be set in such a way that a speed specification determined by a slip control to limit slip of the at least one wheel is set in accordance with the requirements for the slip control. In addition or as an alternative to this, a speed specification specified by an all-wheel regulation, for example to regulate an optimal differential speed between two axles for a motor vehicle with all-wheel drive, can also be set by the state regulator with appropriate damping or appropriate dynamics.

According to the invention, it can be provided that the speed specification is specified by a driving mode control, in particular to carry out a driving mode, a braking mode, and/or a target braking. Correspondingly, the state regulator is designed in such a way that the damping generated by the state regulator or the dynamics of the control of the speed are carried out in such a way that the change in speed corresponds to the specifications or requirements of a driving mode or a braking mode. Adaptation to various driving maneuvers to be carried out, such as target braking or the like, is also possible. The driving mode control can, in particular, be an autonomous driving control, via which an autonomous driving mode of the motor vehicle can take place.

Provision is made for a regulating device according to the invention in that it comprises at least one control unit, the control unit being designed to carry out a method according to the invention. The regulating device of the control unit can also adapt the speed specification to implement a specific function by the regulating device. It is also possible that the adjustments to the speed specification are made, in particular, by a further control unit in each case, so that, for example, slip control, driving mode control, and/or all-wheel control is implemented in one or more additional control units, in which a respectively determined and/or adapted speed specification is transmitted to the regulating device for regulating the drive train.

For a motor vehicle according to the invention, it is provided that it comprises a drive train and a regulating device according to the invention. The drive train of the motor vehicle comprises, in particular, a motor, at least one mechanical component, and at least one wheel, the motor being coupled to the at least one wheel via the at least one mechanical component.

All of the advantages and embodiments described in reference to the method according to the invention also apply accordingly to the regulating device according to the invention and to the motor vehicle according to the invention.

BRIEF DESCRIPTION OF THE FIGURES

Further advantages and designs of the invention will be apparent from the exemplary embodiments described in the following and by means of the drawings. These are schematic representations and show the following.

DETAILED DESCRIPTION

Figure 1:
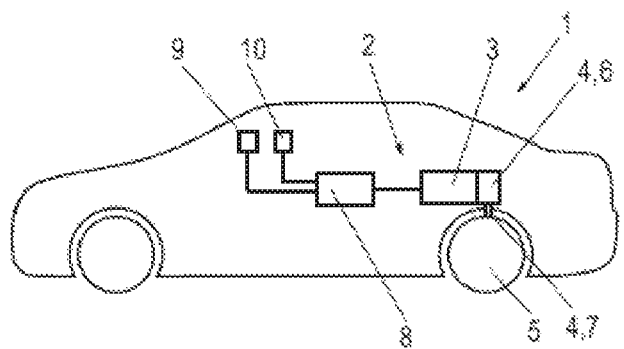
FIG. 1 a side view of an exemplary embodiment of a motor vehicle according to the invention.

FIG. 1 shows a schematic representation of a side view of a motor vehicle 1 according to the invention. The motor vehicle 1 comprises a drive train 2 with a motor 3 which, in the example shown, is coupled to at least one wheel 5 of the drive train 2 via two mechanical components 4 of the drive train 2. One of the mechanical components 4 is designed as a gearbox 6 which is coupled to the at least one wheel 5 via at least one mechanical component 4 of the drive train 2 designed as a side shaft or drive shaft 7.

To regulate the drive train 2, the motor vehicle 1 comprises a regulating device 8. The regulating device 8 comprises a control unit and is connected to further control units 9, 10 of the motor vehicle 1. The regulating device 8 is set up to regulate a speed of the at least one wheel 5 on the basis of a speed specification using a model depicting the drive train 2 of the motor vehicle 1, with a torque generated by the motor 3 as a regulated variable being influenced as a function of at least one state variable of the drive train 2 based on the model. The speed specification can, for example, depend on a current accelerator pedal position and/or, as will be described in more detail below, be influenced and/or specified by one of the further control units 9, 10.

The control of the speed of the at least one wheel 5 by the regulating device 8 takes place by means of a state regulator which uses state variables determined on the basis of a model of the drive train 2 to control the speed or to set the regulated variable. A wheel speed of the at least one wheel 5, a torsion angle of the drive shaft 7 of the drive train 2, a speed of the motor 3, an actual torque of the motor 3, and/or a load torque occurring on the at least one wheel 5 can be used as state variables. The state variables can be determined on the basis of the model with the aid of an observer. The observer for determining the state variables can be implemented as a Luenberger observer, for example. Instead of being estimated by the observer, the actual torque of the motor 3 can also be taken into account in a simulator part of the observer and be included in the state control. The load torque represents an estimated interference variable, which can be used, for example, in the context of a feedforward control. If no feedforward control is used, then the consideration of the load torque in the observer can advantageously lead to an observer error disappearing, which is usually not the case without taking the load torque into account.

Figure 2:
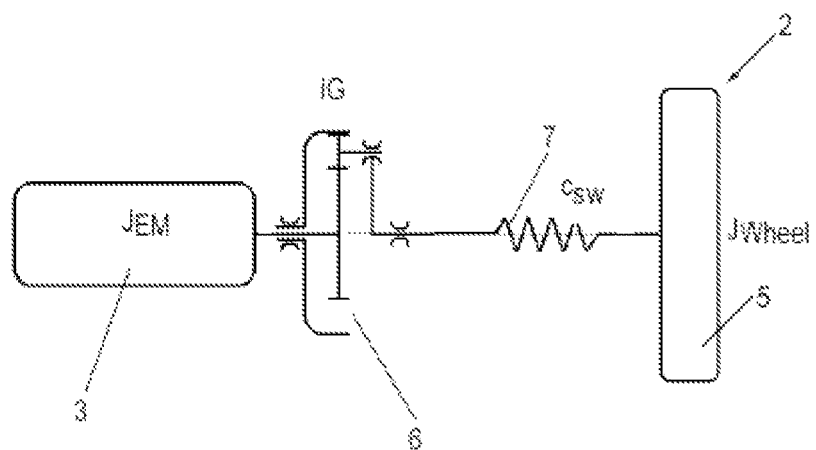
FIG. 2 a model of a drive train of a motor vehicle used for the model description.

A schematic representation of the drive train 2 is shown in FIG. 2. It is shown here that the motor 3 is coupled to the at least one wheel 5 via the gearbox 6 and at least one drive shaft 7. Depending on the design of the motor vehicle 1, it is of course also possible to couple the motor 3, via the gearbox 6, to two drive shafts 7, each designed as a side shaft, and two wheels 5, for example if the motor vehicle includes a motor 3 designed to drive one of the axles of the motor vehicle. Similarly, it is also possible for the drive train 2 to include further components, for example to form an all-wheel drive, so that four wheels 5 are coupled to the motor 3 via a plurality of drive shafts or side shafts and/or at least one gearbox. The motor vehicle 1 can include more than one motor 3, for example each of the four wheels 5 of the motor vehicle can be driven by its own motor 3 or, for example, one of the two axles of the motor vehicle 1 can be driven by two motors 3.

In the model shown, these configurations can be taken into account when selecting the model parameters of the at least one drive shaft 7 or the at least one wheel 5. The exemplary model of the drive train 2 shown in FIG. 2 illustrates a dual-mass oscillator, in which the motor 3 with its inertia $J_{EM}$ is coupled to the at least one wheel 5 with its inertia $J_{Wheel}$ via the gearbox and the drive shaft 4. The motor has a mass inertia $J_{EM}$ and the wheel 5 has a mass inertia $J_{Wheel}$. The drive shaft 7 is assigned a stiffness $c_{SW}$. It is possible that at least mechanical damping of one of the components of the drive train 2 is also taken into account in the model, in particular if ignoring the mechanical damping or an at least partial consideration of the mechanical damping is not reasonably possible when choosing one of the above-mentioned parameters for the components 4 of the drive train 2. The block diagram of the drive train 2 shown in FIG. 3 can be derived from the illustrated model of the dual-mass oscillator for the drive train 2.

Figure 3:
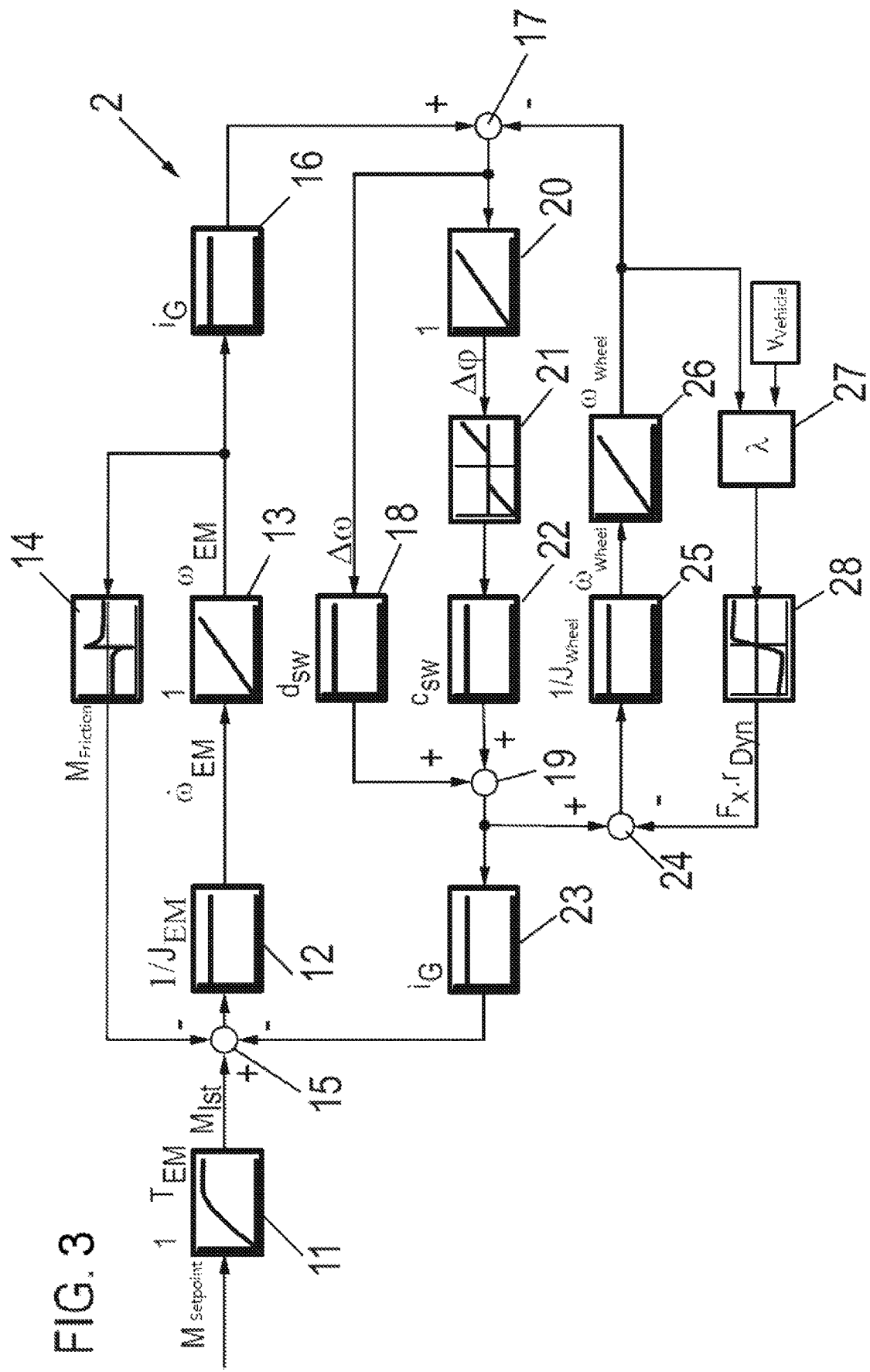
FIG. 3 a model of a control loop for a method according to the invention.

The exemplary block diagram shown in FIG. 3 represents a model of the drive train 2 based on the dual-mass oscillator shown in FIG. 2. The block diagram thus represents the control loop for regulating the drive train 2 and is based on a target torque $M_{SETPOINT}$ of the motor 3, which is implemented via a PT1 element 11 with a gain factor of 1 and a transmission time constant $T_{EM}$ in an actual torque of the motor 3 $M_{ACTUAL}$. This corresponds to the generation of the actual torque $M_{ACTUAL}$ by the motor 3 starting from the target torque $M_{Setpoint}$. As shown by P element 12, the mass inertia $J_{EM}$ of the motor 3 starting from the actual torque $M_{ACTUAL}$ influences a speed change $\dot{\omega}_{EM}$ of the motor speed $\omega_{EM}$. The speed change $\dot{\omega}_{EM}$ is associated with the motor speed $\omega_{EM}$ via an I element 13, which generates a friction torque of the motor $M_{FRICTION}$ as a function of a nonlinear function 14, which friction torque counteracts the actual torque $M_{ACTUAL}$, as shown at summation node 15.

The motor speed $\omega_{EM}$ is connected to node 17 via the I element 16 with the inverse gear ratio $i_g$ as a gain factor. The speed difference $\Delta\omega$ determined at node 17 between the speed of the gearbox 6 and the speed $\omega_{Wheel}$ of the at least one wheel 5 subtracted therefrom acts on summation node 19 via a P element 18 with the gain factor $d_{SW}$.

From the speed difference $\Delta\omega$, integration via an I element 20 results in a torsion angle $\Delta\varphi$ of the side shaft, which is also supplied to node 19 as a gain factor via a nonlinear function 21 and a P element 22 with the stiffness $C_{SW}$ of the drive shaft 7. Node 19 reacts to node 15 via the P element 23, the gain factor of the P element 23 corresponding to the gear ratio $i_G$. The torque occurring on the wheel side determined at the output of node 19 reacts to node 17, via node 24 and correspondingly via I element 25 with the inverse inertia $J_{WHEEL}$ of at least one wheel 5, as a gain factor as a change in speed $\dot{\omega}_=$ or as the wheel speed $\omega_=$ after integration into an I element 26.

At node 24, the load torque on the wheel $F_x \cdot r_{Dyn}$ resulting from a slip $\lambda$ is subtracted as block 27, the slip $\lambda$ being determined via a non-linear function 28 as a function of a current speed of the vehicle $V_{VEHICLE}$ and the wheel speed $\omega_=$. The load torque $F_x \cdot r_{Dyn}$ in this case results from a force acting at the at least one wheel 5 $F_x$ multiplied by a dynamic wheel diameter of $r_{Dyn}$ the at least one wheel 5.

The above-described model of the drive train 2 can then be simplified, in that, in particular, the non-linear effects are ignored and/or are recorded as an additional component of the load torque which is considered below as an interference variable in the regulation $F_x \cdot r_{Dyn}$. This makes it possible to describe the drive train 2 by the following equations in the state space, transformed as relates to the wheel plane:

$$\begin{bmatrix} \dot{\omega}_= \\ \dot{\omega}_{EM,R} \\ \dot{\omega} \end{bmatrix} = \begin{bmatrix} 0 & 0 & \frac{c_{SW}}{J_{Wheel}} \\ 0 & 0 & -\frac{c_{SW}}{J_{EM,R}} \\ -1 & 1 & 0 \end{bmatrix} \cdot \begin{bmatrix} \omega_{WHEEL} \\ \omega_{EM} \\ \Delta\varphi \end{bmatrix} + \begin{bmatrix} 0 \\ \frac{1}{J_{EM,R}} \\ 0 \end{bmatrix} \cdot M_{Actual} + \begin{bmatrix} -\frac{1}{J_{Wheel}} \\ 0 \\ 0 \end{bmatrix} \cdot F_x \cdot r_{Dyn} \quad (1)$$

$$\begin{bmatrix} \omega_{WHEEL} \\ \omega_{EM,R} \end{bmatrix} = \begin{bmatrix} 1 & 0 & 0 \\ 0 & 1 & 0 \end{bmatrix} \cdot \begin{bmatrix} \omega_{WHEEL} \\ \omega_{EM,R} \\ \Delta\varphi \end{bmatrix} \quad (2)$$

Equations (1) and (2) represent a model of the drive train and can then be used as a basis for an observer to determine state variables in the drive train 2. As a result of the transformation as relates to the wheel plane, the inverse gear ratio is considered $i_G$ in the wheel-side variables of the motor speed $\omega_{EM,R}$ and the inertia $J_{EM,R}$. The observer can then be used in a state regulator for speed-based control of the drive train.

$$\begin{bmatrix} \dot{\omega}_{WHEEL} \\ \dot{\omega}_{EM,R} \\ \Delta\dot{\omega} \\ \dot{F}_x \cdot r_{Dyn} \end{bmatrix} = \begin{bmatrix} 0 & 0 & \frac{c_{SW}}{J_{Wheel}} & -\frac{1}{J_{Wheel}} \\ 0 & 0 & -\frac{c_{SW}}{J_{EM,R}} & 0 \\ -1 & 1 & 0 & 0 \\ 0 & 0 & 0 & 0 \end{bmatrix} \cdot \begin{bmatrix} \omega_{WHEEL} \\ \omega_{EM,R} \\ \Delta\varphi \\ F_x \cdot r_{Dyn} \end{bmatrix} + \begin{bmatrix} 0 \\ \frac{1}{J_{EM,R}} \\ 0 \\ 0 \end{bmatrix} \cdot M_{Actual} \quad (3)$$

$$\begin{bmatrix} \omega_{WHEEL} \\ \omega_{EM,R} \end{bmatrix} = \begin{bmatrix} 1 & 0 & 0 & 0 \\ 0 & 1 & 0 & 0 \end{bmatrix} \cdot \begin{bmatrix} \omega_{WHEEL} \\ \omega_{EM,R} \\ \Delta\varphi \\ F_x \cdot r_{Dyn} \end{bmatrix} \quad (4)$$

In this case, equations (3) and (4) represent a description of the observer in the state space, which also contain a model of an interference, in addition to equations (1) and (2).

The vector $$\begin{bmatrix} \omega_{WHEEL} \\ \omega_{EM,R} \\ \Delta\varphi \\ F_x \cdot r_{Dyn} \end{bmatrix}$$

contains the state variables estimated by the observer, namely the wheel speed $\omega_{WHEEL}$, the motor speed $\omega_{EM,R}$, the torsion angle of the at least one side shaft, $\Delta\varphi$ and the load torque $F_x \cdot r_{Dyn}$. In the state control comprising the observer, an actual torque $M_{ACTUAL}$ of the motor 3 can further be used as a state variable, in which the actual torque $M_{ACTUAL}$ can be determined by a direct measurement on the motor and/or by an indirect measurement via a further variable. In a state space description of the control loop, which represents the basis for the design of the state regulator, the actual torque $M_{ACTUAL}$ of the motor 3 can be included, for example, instead of the load torque $F_x \cdot r_{Dyn}$. In this case, for example, the system of differential equations can be extended by a differential equation describing these dynamics in the case of a non-negligible dynamic of the actual torque build-up. The differential equation system can then be reduced by the differential equation for describing the dynamics of the load torque when this is no longer required. In addition or as an alternative to a measurement of the actual torque $M_{ACTUAL}$, this can also be estimated by the observer or generated via a simulator part of the observer or formed via the observer feedback. As relates to the wheel speed $\omega_{WHEEL}$ and the motor speed $\omega_{EM}$, the use of a measured value is additionally or alternatively possible, which is determined, for example, via a speed sensor assigned to the wheel 5 or via a speed sensor assigned to the motor 3.

Figure 4:
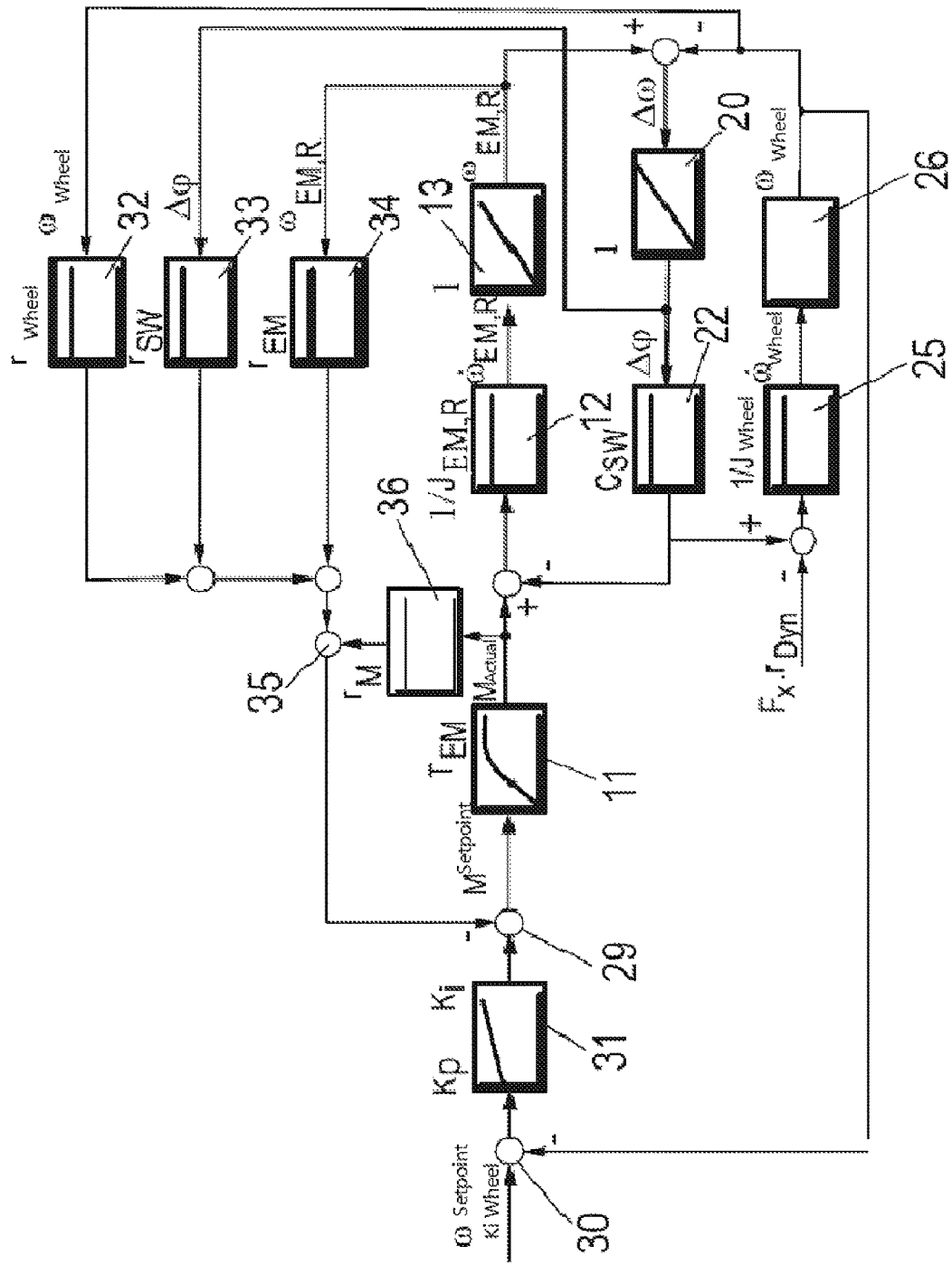
FIG. 4 a block diagram of an exemplary embodiment of a method according to the invention for regulating a drive train of a motor vehicle.

FIG. 4 shows a block diagram of the speed regulator used in an exemplary embodiment of a method for regulating the drive train 2 of the motor vehicle 1. The speed control is based on a speed specification $\omega_{WHEEL}^{SETPOINT}$, which is supplied to the regulator at node 30. The speed specification $\omega_{WHEEL}^{SETPOINT}$, or a control deviation formed from the speed $\omega_{WHEEL}^{SETPOINT}$ specification, is connected to node 29 via a PI regulator 31. On the basis of the model described with formulas (1) and (2), with the aid of an observer realized, for example, as a Luenberger observer, a wheel speed of the at least one wheel $\omega_{WHEEL}$, a torsion angle of the drive shaft 7 $\Delta\varphi$, a speed of the motor $\omega_{EM}$, as well as the load torque $F_x \cdot r_{Dyn}$ acting as an interference torque are determined as state variables. As a further state variable, an actual torque $M_{ACTUAL}$ of the motor 3 is determined by a measurement. The actual torque of $M_{ACTUAL}$ the motor 3 can be measured directly or can be determined from the measurement of another variable, for example a measured actual motor current. In addition or as an alternative to a measurement of the actual torque $M_{ACTUAL}$, this can also be estimated by the observer or generated via a simulator part of the observer or formed via the observer feedback.

In this case, an influence of the setpoint motor torque $M_{SETPOINT}$ used as a regulated variable of the speed control takes place via the determined state variables. In this case, the wheel speed, $\omega_{WHEEL}$ via P element 32 with the gain factor $r_{WHEEL}$, the determined torsion angle $\Delta\varphi$, via P element 33 with the gain factor $r_{SW}$, and the motor speed $\omega_{EM,R}$, via P element 34 with the gain factor $r_{EM}$, each act on node 35. The actual torque $M_{ACTUAL}$ of the motor 3 likewise acts on node 35 via P element 36 with a gain factor $r_m$.

The sum formed in node 35 has a negative effect in node 29, for example, on a $\omega_{WHEEL}^{SETPOINT}$ torque determined from the speed specification, via PI regulator 31, for generating the regulated variable $M_{SETPOINT}$. The variables that are ignored compared to the model shown in FIG. 3 are at least partially summarized by $F_x \cdot r_{Dyn}$ as an interference variable, which is likewise determined as a state variable. The load torque $F_x \cdot r_{Dyn}$ can be assumed to be constant over a cycle time of the regulation and re-estimated for each new cycle. The load torque $F_x \cdot r_{Dyn}$ can be used, in particular, when implementing a feedforward control. When using a PI state regulator, the estimated load torque has no influence. An influence on the regulated drive train generated by a load torque actually acting on at least one wheel 5 is taken into account by the I component in PI regulator 31.

The state variables determined by the observer can be compared, in particular as a function of a current operating state of at least one of the components of the drive train 2, with an actual speed determined via a speed sensor assigned to the motor 3 and/or a wheel speed determined via a speed sensor assigned to the at least one wheel 5, in order to achieve a higher accuracy of the estimation of the state variables by the observer. PI regulator 31 also compensates for interference variables, the I component of PI regulator 31 ensuring steady-state accuracy and carrying out steady-state compensation for the effects ignored in the modeling in regulating the speed. As an alternative to the configuration of the regulator as a PI state regulator via PI regulator 31, it is also possible to implement the regulation as a state regulation with a feedforward control in order to achieve improved steady-state accuracy. In this case, the load torque can be used $F_x \cdot r_{Dyn}$ as an interference variable. It is possible for the PI state regulator or the feedforward control to be designed in a subsequent error structure if asymptotic compensation of a control deviation is to take place for ramp-shaped setpoint specifications.

Depending on the drive train 2 of the motor vehicle 1, on which the model used in the regulation is based, various functions can be implemented by means of the method for speed control. Furthermore, a simple adaptation of the method or the regulating device 8 designed to implement the method is carried out on different motor vehicle models or different model variants, which differ, for example, in the design of their drive train 2. This can be done by selecting model parameters $J_{EM,R}$, $J_{WHEEL}$, and $C_{SW}$ related to the drive train. The regulation can be adapted to various functions by selecting the corresponding gain factors $r_{WHEEL}$, $r_{SW}$, $r_{EM}$, and $r_M$ as well as $K_p$ and $K_i$. This makes it possible to adapt the damping behavior of the regulation to the given requirements for the respective function.

For example, it can be provided that the regulated variable, that is to say the motor setpoint torque $M_{SETPOINT}$, is adapted to damp a vibration of at least one component of the drive train 2 and/or to protect a component of the drive train 2. In this way, for example, excessive torsion occurring in the drive shaft 7 can be avoided. It is also possible for the speed $\omega_{WHEEL}^{SETPOINT}$ specification to be adapted by a slip control to limit a slip of the at least one wheel 5, a slip control being carried out accordingly by the regulator. Also, for example in a motor vehicle 1 that includes two motors 3, each coupled to an axle and thus to two wheels 5, a speed specification determined by an all-wheel drive control can be adjusted with a correspondingly adapted regulator to form a speed difference.

It is also possible for the speed specification to be specified by a driving mode control of the motor vehicle 1, for example in order to carry out a driving mode, a braking mode, and/or various driving maneuvers such as target braking. In this case as well, the drive of the motor vehicle 1 can be regulated by means of the method for drive regulation in accordance with the speed specification with damping adapted to the respective application or damping behavior adapted to the respective application. In addition to regulating the speed of the at least one wheel 5, regulating the speed of another component of the drive train 2, for example regulating the speed of the motor 3, is possible by means of a corresponding design of the regulator or by appropriate selection of its parameters.

The invention claimed is:

1. A method for regulating a drive train of a motor vehicle, wherein the drive train comprises, as components a motor, at least one mechanical component and at least one wheel, wherein the motor is coupled to the at least one wheel via the at least one mechanical component, the method comprising:
   regulating a speed of the at least one component of the drive train based on a speed specification using a model depicting the drive train of the motor vehicle;
   determining at least one state variable of the drive train based on the model; and
   determining a torque generated by the motor as a regulated variable as a function of the at least one state variable.

2. The method according to claim 1, wherein the model comprises at least one damping of a component of the drive train.

3. The method according to claim 1, wherein the model comprises at least one of a time delay of a torque generation in the motor, a moment of inertia of the motor, a moment of inertia of the at least one wheel, and a stiffness of a drive shaft of the drive train.

4. The method according to claim 1, further comprising:
   determining at least one of a wheel speed of the at least one wheel, a torsion angle of a drive shaft of the drive train, a speed of the motor, an actual torque of the motor, and a load torque occurring at the at least one wheel on the basis of the model.

5. The method according to claim 1, wherein the state variable is determined by an observer.

6. The drive train according to claim 1, wherein the at least one determined state variable is compared with at least one measured variable.

7. The method according to claim 6, further comprising:
   performing a comparison with an actual speed of the motor and/or a wheel speed of the at least one wheel as a function of a current operating state of at least one component of the drive train.

8. The method according to claim 1, wherein the regulation is implemented as Proportional Integral (PI) state control and/or as a state control with feedforward control and/or as a subsequent error regulation.

9. The method according to claim 1, further comprising:
   adapting the speed specification to at least one of a limitation of a maximum speed, a limitation of a minimum speed, and a setpoint speed control.

10. The method according to claim 1, further comprising:
    adapting the regulated variable to at least one of damping a vibration of at least one component of the drive train and protecting a component of the drive train.

11. The method according to claim 1, further comprising:
    adapting the speed specification to at least one of limiting a slip of the at least one wheel by a slip control and creating a speed difference by an all-wheel regulation.

12. The method according to claim 1, wherein the speed specification is specified by a driving mode control.

13. A regulating device, comprising at least one control unit, wherein the control unit is designed to carry out the method according to claim 1.

14. A motor vehicle comprising the drive train of and claim 13.

15. The method according to claim 2, wherein the model comprises at least one of a time delay of a torque generation in the motor, a moment of inertia of the motor, a moment of inertia of the at least one wheel, and a stiffness of a drive shaft of the drive train.

16. The method according to claim 2, further comprising:
determining at least one of a wheel speed of the at least one wheel, a torsion angle of a drive shaft of the drive train, a speed of the motor, an actual torque of the motor, and a load torque occurring at the at least one wheel on the basis of the model.

17. The method according to claim 3, further comprising:
determining at least one of a wheel speed of the at least one wheel, a torsion angle of a drive shaft of the drive train, a speed of the motor, an actual torque of the motor, and a load torque occurring at the at least one wheel on the basis of the model.

18. The method according to claim 2, wherein the state variable is determined by an observer.

19. The method according to claim 3, wherein the state variable is determined by an observer.

20. The method according to claim 4, wherein the state variable is determined by an observer.

\* \* \* \* \*